Figure 1:
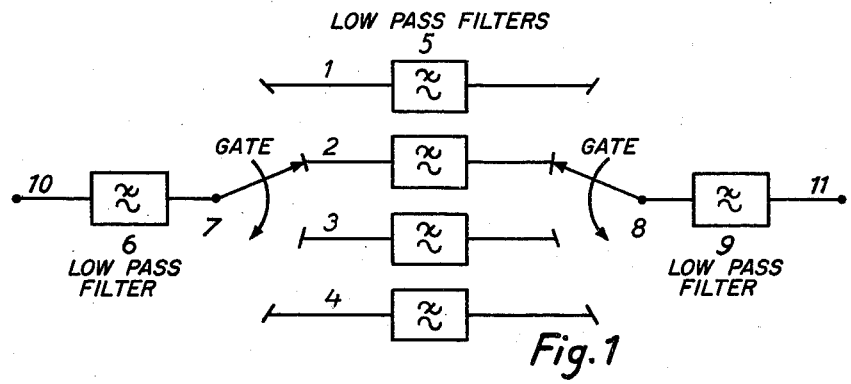

Dec. 1, 1964  A. K. BERGMANN ETAL  3,159,720
TELECOMMUNICATION SYSTEM
Filed April 10, 1961  6 Sheets-Sheet 1

INVENTOR.
ANDERS KARLBY BERGMANN
ANTON CHRISTIAN JACOBAEUS
HENRY SCHEFTELOWITZ
BY Haine and Nydick
ATTORNEYS

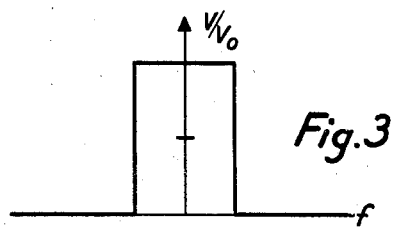
Fig.3a
Fig.3
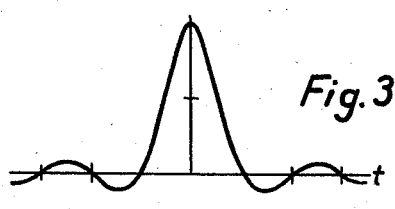
Fig.3b
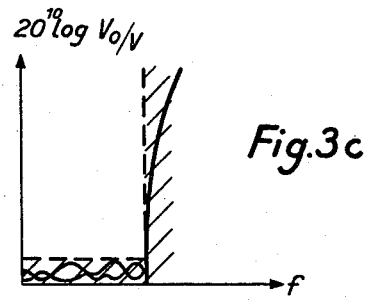
Fig.3c
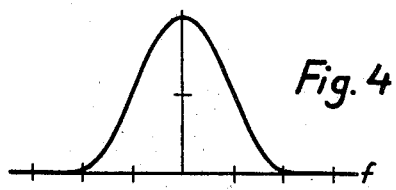
Fig.4
Fig.4a
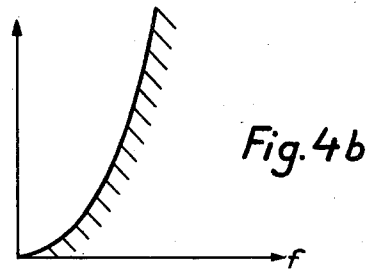
Fig.4b
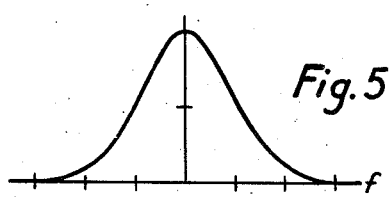
Fig.5
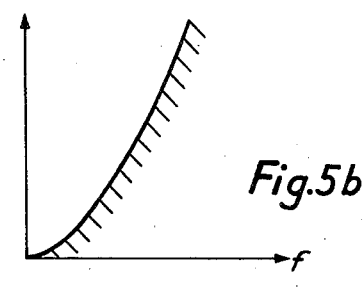
Fig.5b
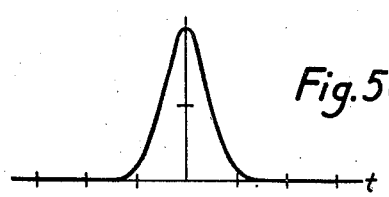
Fig.5a

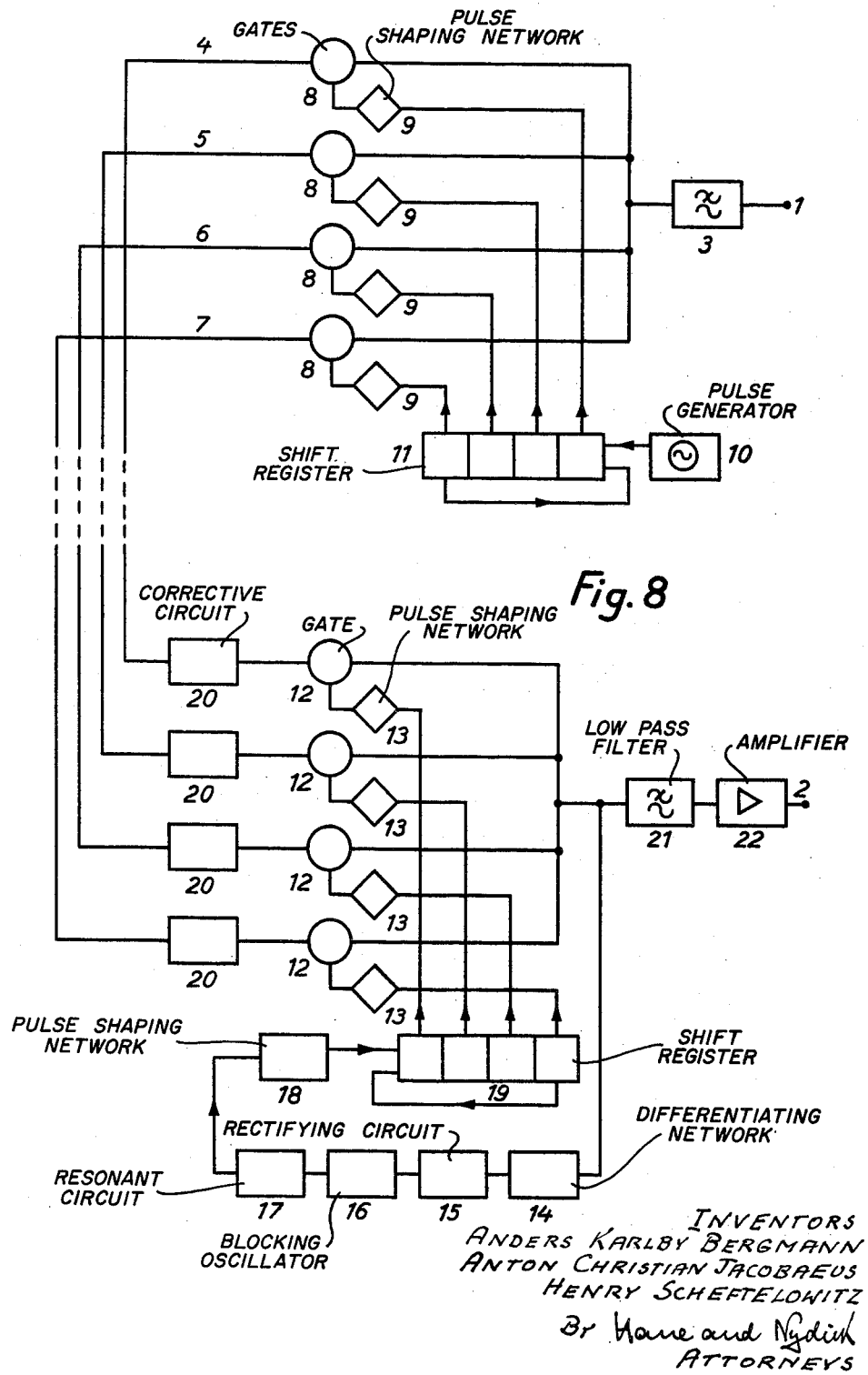

United States Patent Office 3,159,720
Patented Dec. 1, 1964

3,159,720
TELECOMMUNICATION SYSTEM
Anders Karlby Bergmann, Galion, Ohio, and Anton Christian Jacobaeus, Stockholm, and Henry Scheftelowitz, Hagersten, Sweden, assignors to Telefonaktiebolaget L M Ericsson, Stockholm, Sweden, a corporation of Sweden
Filed Apr. 10, 1961, Ser. No. 102,037
Claims priority, application Sweden Jan. 24, 1961
1 Claim. (Cl. 179—15.55)

This invention covers a system for transmission of signals ranging over a frequency band wider than the band possible to transmit per channel in a transmission system consisting of a number of like transmission channels, and in which transmission system each channel is equivalent to a filter with low pass characteristics. The cutoff frequency of this filter is lower than the higher frequencies of the above-mentioned frequency band.

In certain cases one wants to make use of, for instance, a telephone line for transmitting a frequency band of a bandwidth greater than the one that can be allowed with regard to the cutoff frequency of the line. Radio program channels are an appropriate example of this. These channels cover a frequency band with an upper cutoff frequency of 8000 c./s. This frequency band is normally transmitted via special facilities. Under certain circumstances when such facilities are not available it should be possible to transmit this band via ordinary telephone lines that have their upper cutoff frequency at 3400 c./s. In this case it would be desirable to transmit the program channel with maintained bandwidth by using a number of the above-mentioned telephone lines. The 8000 c./s. of the program channel would then be distributed over a number of lines, each having a cutoff frequency of 3400 c./s. At the receiving end these frequencies would be recombined to give the 8000 c./s.

This is made possible by means of the invention of the system to be described in this specification. Gate circuits, working synchronously and cyclically, are in this system connected to the input and output sides of the transmission system. The operation of the input and output gate circuits is displaced in time by an interval equal to the time delay of the above-mentioned channels. These gate circuits together with other units such as, for instance, pulse generator, shift register, and pulse-shaping networks, are so arranged that the incoming signal to the input side of the transmission system is split with regard to time and distributed to the different channels, and is reproduced at the output side of the transmission system. The pulses in the various channels will have a repetition frequency with a specific relationship to the bandwidth of the transmitted signal as well as to the cutoff frequency of the filter in question.

Figure 2:
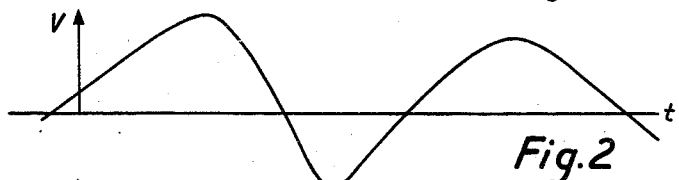
Figure 2A:
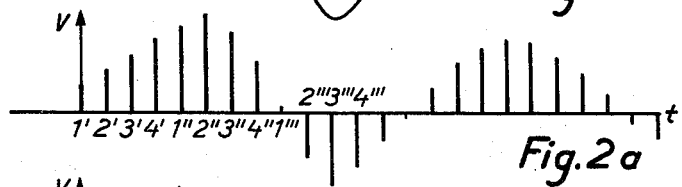
Figure 2B:
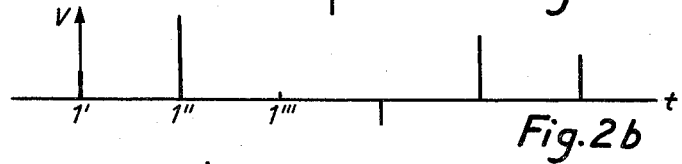
Figure 2C:
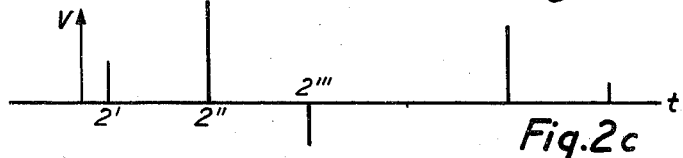
Figure 2D:
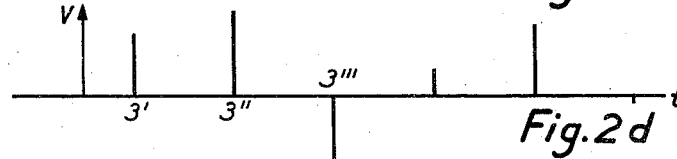
Figure 2E:
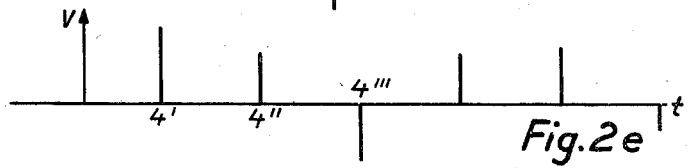
Figure 6:
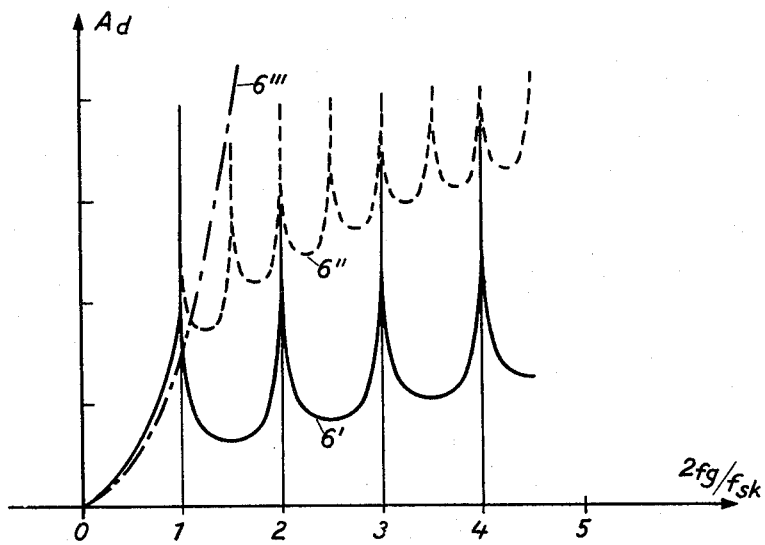
Figure 7:
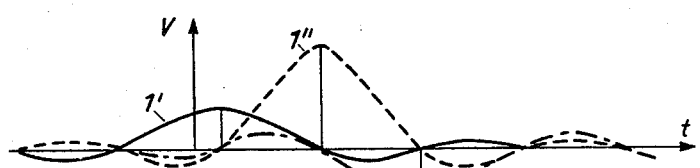
Figure 7A:
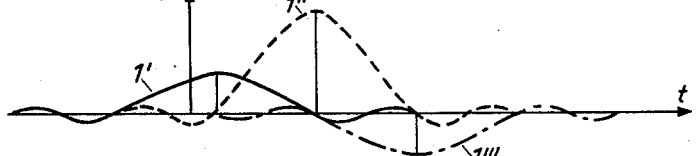
Figure 7B:
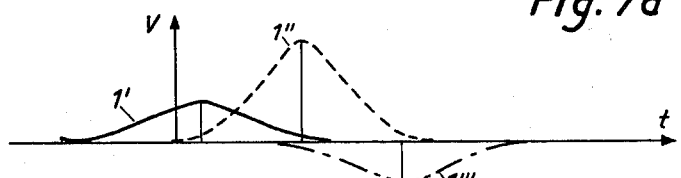
Figure 8A:
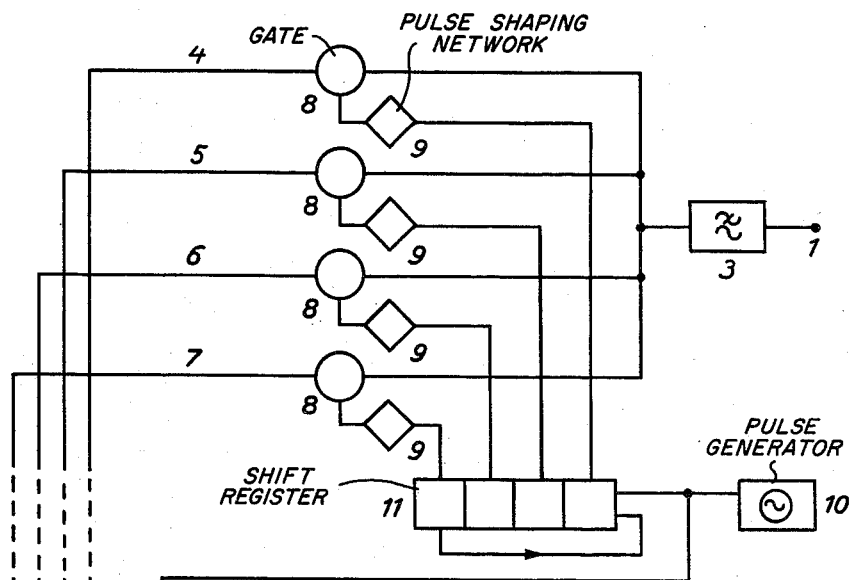
Figure 8A:
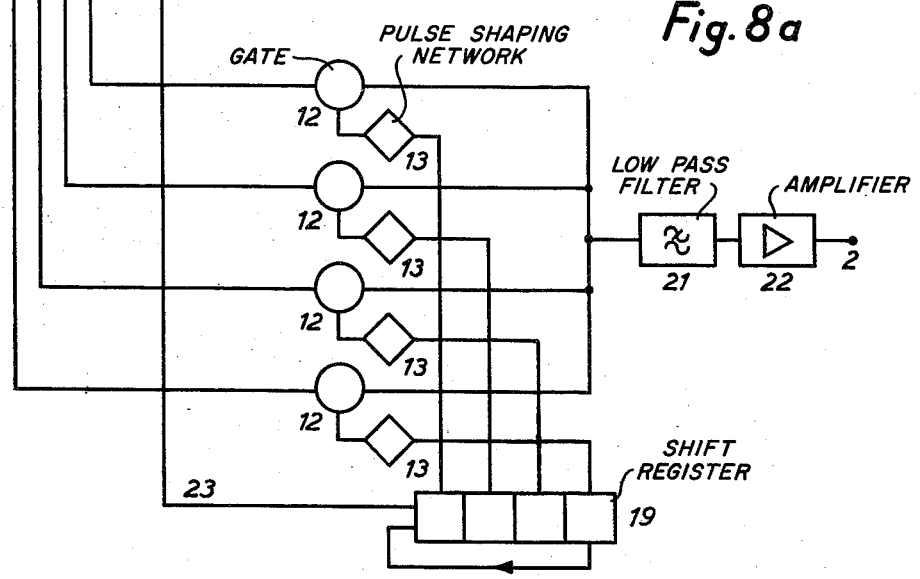
Figure 9:
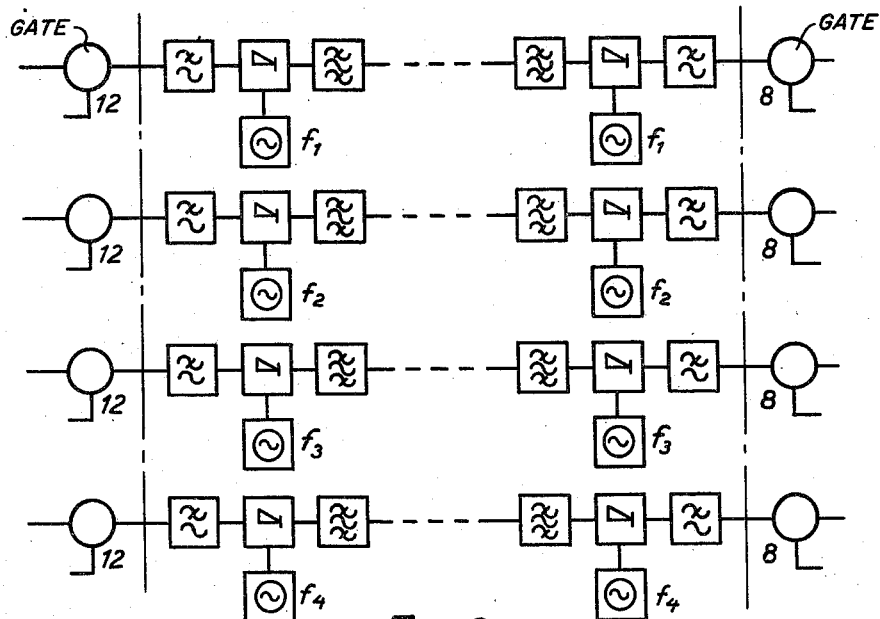
Figure 10:
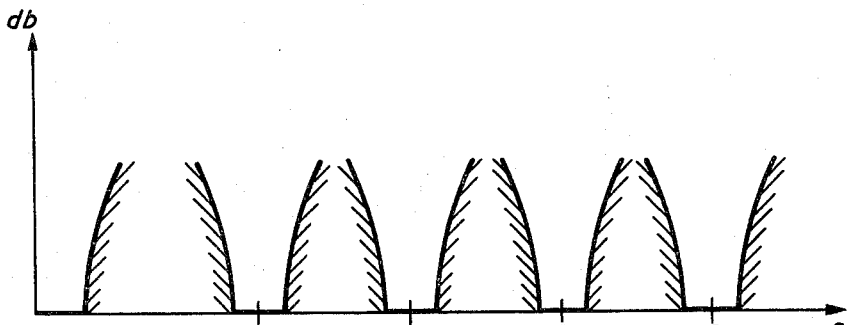

A more detailed description of the system will now be given with reference made to the drawings, in which FIG. 1 shows the basic design of the system; FIG. 2 is an example of a signal voltage to be transmitted; FIG. 2a shows this voltage after pulse-amplitude modulation; FIGS. 2b to 2e show the pulses obtained after modulation as they are distributed to the different transmission channels; FIG. 3 shows a four-pole network containing a filter with low pass characteristics; FIG. 3a shows the transfer function; FIG. 3b the impulse response, and FIG. 3c the attenuation curve of an ideal low pass filter; FIGS. 4, 4a, and 4b show the same functions of a low pass filter, the attenuation curve of which is represented by a cosine function; FIGS. 5, 5a, and 5b show the corresponding functions of a low pass filter, the attenuation curve of which is represented by a gaussian function; FIG. 6 shows the pulse interference attenuation for the various filter types; FIGS. 7, 7a, and 7b show the form of the short pulses after passage through an ideal, a cosine, and a gaussian filter respectively; FIGS. 8 and 8a show two different designs of the system both in accordance with the invention; FIG. 9 shows a system in accordance with the invention in which part of the transmission system consists of a carrier frequency unit; and FIG. 10 shows the attenuation curves of the transmission channels of the above-mentioned carrier frequency system.

The basic design of the system is illustrated in FIG. 1. On an incoming line 10 there is a signal voltage to be transmitted to an outgoing line 11. The signal contains all frequencies ranging from zero to a certain uppermost frequency. This signal on the incoming line shall, via a transmission system, be transmitted to the outgoing line. The transmission system consists of a number of parallel and like transmission channels 1, 2, 3, and 4. The transmission capacity of each channel is limited to a certain upper frequency that is lower than the higher frequencies in the signal to be transmitted. Each channel can therefore be considered equivalent to a low pass filter 5. Devices 7 and 8, gate circuits for example, are connected between the incoming line and the transmission system and between the transmission system and the outgoing line respectively. By means of these devices the incoming signal is split with regard to time and distributed to the different channels and is then recombined on the outgoing line. The corresponding gate circuits at the input and the output sides of the system work synchronously but are displaced in time in relation to one another by an interval equal to the time delay the signal encounters on its way through the system. As frequencies that exceed the maximum allowed frequency in the incoming signal would cause distortion, the bandwidth of the incoming signal is limited by means of a low pass filter 6. Another low pass filter 9, is connected to the output side of the transmission system for a corresponding limitation of the received signal. An example of an incoming signal voltage is shown in FIG. 2. The operation of the gates upon this signal voltage will result in amplitude modulated pulses as shown in FIG. 2a. The signal voltage has been split into a number of very short pulses which in FIG. 2a are designated $1'$, $2'$, $3'$, $4'$, $1''$, $2''$, $3''$, $4''$, $1'''$, $2'''$, etc. These pulses will be distributed to the different transmission channels in such a manner that pulse $1'$ is fed to channel 1, pulse $2'$ to channel 2, pulse $3'$ to channel 3, pulse $4'$ to channel 4, pulse $1''$ to channel 1, pulse $2''$ to channel 2, etc. This is evident from FIGS. 2a, 2c, 2d, and 2e, which show the pulses as distributed to the channels 1, 2, 3, and 4.

The frequency band that the incoming signal covers and that shall be transmitted to the output side is assumed to have a highest nominal frequency $f_{max}$ (the actual highest frequency is somewhat lower). The incoming signal voltage must then, according to the so called sampling theorem, be sampled with a frequency $f_s$ that must stand in the following relation to $f_{max}$:

$$f_s \geq 2 f_{max}$$

Thus the sampling frequency has to be equal to or larger than double the value of the highest frequency to be transmitted. If the transmission system contains a number $k$ of channels, the sampling frequency per channel $f_{sk}$ will be $$f_{sk} = \frac{f_s}{k}$$

$f_{sk}$ will then be the repetition frequency of the pulses per transmission channel. The time $T_{sk}$ between each pulse will be $$T_{sk} = \frac{1}{f_{sk}}$$

As each transmission channel can be considered equivalent to a filter with low pass characteristics, the pulse repetition frequency that can be transmitted per channel will depend on the cutoff frequency $f_g$ of the filter in such a manner that $$f_{sk} \leq 2f_g$$

As an example of $f_{max}$, 20000 c./s. may be selected. The total sampling frequency $f_s$ must then be at least equal to 40000 c./s. If the cutoff frequency $f_g$ for each channel is 5000 c./s., for example, the sampling frequency per channel must not exceed 10000 c./s. The lowest number $k$ of transmission channels which are then required will thus be 4. The time $T_{sk}$ between each pulse per channel will then be $\frac{1}{10000} = 100$ microseconds.

From the preceding it is evident that there exists a certain relationship between the pulse repetition frequency per channel and the highest frequency in the signal that shall be transmitted. Furthermore, there consequently exists a certain relationship between the above-mentioned pulse repetition frequency and the cutoff frequency of the transmission channel. This interrelationship is dependent on the type of filter to which the transmission channel can be considered equivalent. They can either consist of a filter with an attenuation curve that in principle coincides with the attenuation curve of an ideal low pass filter, or of a filter with an attenuation curve that, expressed in decibels, is represented by twenty times the logarithm to base 10 for a cosine or a gaussian function. In FIG. 3 a four pole network is shown that contains a filter with low pass characteristics. The input voltage to the four pole network is designated $V_0$ and the output voltage $V$. FIGS. 3a, 4, and 5 show the transfer function ($V/V_0$ as a function of the frequency $f$) for the different filter types. Furthermore, FIGS. 3b, 4a, and 5a show the impulse response obtained through $V/V_0$ as a function of the time $t$. The attenuation curves for the different filter types are shown in FIGS. 3c, 4b, and 5b.

Attenuation curves for a low pass filter that in principle coincide with the attenuation curve of an ideal low pass filter are shown in FIG. 3c. The Tchebycheff filter, the Maximally flat filter, and the constant K-filter with or without derivation are a few examples of filters which are considered in this filter group. The attenuation curves of these filter types are also indicated in FIG. 3c.

As stated above, a transfer function ($V/V_0$ as function of $f$) of an ideal low pass filter is illustrated in FIG. 3a. If a very short pulse, a so called δ-pulse, passes through a filter of this kind, it will assume a form as the one shown in FIG. 3b. It is evident from this figure that extra oscillations have been added to it. The so called impulse response in the following written as $s(t)$, which was illustrated in FIG. 3b, can be defined mathematically by the equation:

$$s\delta(t) = K \frac{\sin \pi t/t_g}{t/t_g}$$

in which $K$ is a constant that depends on the width of the applied pulse, and $t_g$ is the rise time for a step function through the four pole network, $t_g$ is the rise time for a step function through the four pole network, $t_g$ being defined as $$t_g = \frac{1}{2f_g}$$

in which $f_g$ is the cutoff frequency of the filter.

For $t = t_g$ we obtain $$s\delta(t_g) = K \frac{\sin \pi}{\pi} = 0$$

$$s\delta(t) = 0 \text{ for } t = n \cdot t_g, 2t_g, 3t_g, 4t_g, \ldots$$

In the previously stated example $f_g$ is 5000 c./s. $t_g$ is then equal to $$\frac{1}{2 \cdot 5000} = 100 \text{ microseconds}$$

As the zero points for the oscillations of the impulse response in this case will coincide with the positions of the short pulses, $T_{sk}$ will consequently be equal to $t_g$. This is also evident from FIG. 7 which shows the form of the short pulses in channel 2 of the transmission system after they have passed an ideal low pass filter.

As $t = n \cdot t_g$, $f_{sk}$ will be $= 2f_g/n$; where $n = 1, 2, 3, 4, \ldots$ Accordingly, $n$ is a factor for determining the sampling frequency $f_{sk}$ per channel.

For an ideal low pass filter the following relationship between $f_{max}$, $f_s$, $f_{sk}$, and $f_g$ obtains $$\begin{cases} f_{sk} = 2f_g/n, \text{ where } n = 1, 2, 3, 4, \ldots \\ f_{sk} = f_s/k \\ f_s \geq 2f_{max} \end{cases}$$

If the gate circuits at the receiving side of the transmission system work with such a frequency that the sampling frequency per channel will be equal to the repetition frequency for the short pulses which were originally applied to each channel, the sampling of the pulses obtained after the passage through the filter will be affected at such points that there will be no appreciable distortion of the incoming signal. The sampling frequency per channel $f_{sk}$ can then be equal to $2f_g$, $f_g$, $2f_g/3$, $f_g/2$, etc.

For a filter, the attenuation curve of which expressed in decibels is represented by a 20 $\log_{10}$ for a cosine function, the transfer function will have a form as the one shown in FIG. 4. The attenuation curve for this type of filter is shown in FIG. 4b. FIG. 4a shows the impulse response that is obtained when a very short pulse has passed the filter. The impulse response $s\delta(t)$ can be expressed mathematically as follows:

$$s\delta(t) = \frac{\sin 2\pi t/t_g}{2\pi t/t_g} \cdot \frac{1}{1 - 4(t/t_g)^2}$$

For $t = t_g$ we get $$s\delta(t_g) = K \frac{\sin 2\pi}{2\pi} \cdot \frac{1}{1-4} = 0$$

$$s\delta(t) = 0 \text{ for } t = n \cdot t_g/2, \text{ where } n = 2, 3, 4, 5, \ldots$$

As an example may be selected, as before, $f_g = 5000$ c./s. As $t_g = 1/2f_g$, $t_g = 100$ microseconds is obtained. In this case also it applies that $T_{sk} = t_g$.

As $t = n \cdot t_g/2$, we get $f_{sk} = 4f_g/n$, where $n = 2, 3, 4, 5, \ldots$ FIG. 7a exemplifies the form of the short pulses in transmission channel 2 after they have passed through a filter of this type. As is evident from this figure, the resulting extra oscillations have their zero points located at points that coincide with the positions of the original short pulses, or at points that are located exactly halfways between these positions.

If the transmission channel is equivalent to a filter of this type, it means that the channels can be sampled with frequencies that coincide with the frequencies for the ideal filter, as well as with frequencies with values exactly halfways between those of the frequencies suitable for the ideal filter. This is also evident from the relationship between $f_{sk}$ and $f_g$. For a low pass filter of the "cosine type" the following relationship between $f_{max}$, $f_s$, $f_{sk}$, and $f_g$ consequently obtains $$f_{sk} = 4f_g/n, \text{ where } n = 2, 3, 4, 5, \ldots$$

$$f_{sk} = f_s/k$$

$$f_s \geq 2f_{max}$$

The transfer function of a filter, the attenuation curve of which, expressed in decibels, is represented by a 20 $\log_{10}$ log for a gaussian function is shown in FIG. 5. The attenuation curve for this type of filter is shown in FIG. 5b. FIG. 5a shows the impulse response obtained when a very short pulse has passed through the filter in question. The following mathematical expressions obtain for the impulse response $s\delta(t)$ $$s\delta(t) = Ke^{-\pi(t/t_g)^2}$$

$$s\delta(t) = 0 \text{ for } t \geq 1.4 t_g$$

As $t_g$ even in this case is $1/2f_g$ we get $$f_{sk} \leq 2f_g/1.4$$

In order to cause as little distortion as possible, the sampling frequency per channel shall thus be chosen equal to or less than $2f_g/1.4$.

For a gaussian filter, there is hence the following relationships between $f_{max}$, $f_s$, $f_{sk}$, and $f_g$:

$$\begin{cases} f_{sk} \leq 2f_g/1.4 \\ f_{sk} = f_s/k \\ f_s \geq 2f_{max} \end{cases}$$

As is evident from the preceding paragraphs, the transmitted signal can be reproduced without any appreciable distortion, provided that the above-mentioned requirements on the interrelationship between $f_{sk}$ and $f_g$ are met for the different filter types.

Another very important condition for reproduction free from distortion is a high pulse interference attenuation. The pulse interference attenuation is the ratio that exists at the very sampling moment between the voltage amplitude of the pulse and the sum of the voltage amplitudes of adjacent pulses. This attenuation should thus be as high as possible in order to preclude pulse interference. The pulse interference attenuations of the various filter types are given in FIG. 6. The attenuation curves for an ideal filter are designated 6', those of a cosine filter 6'', and those of a gauss filter 6'''. The pulse interference attenuation $A_d$ in FIG. 6 is given as a function of $2f_g/f_{sk}$.

For the ideal filter, attenuation peaks are obtained for $2f_g/f_{sk} = 1, 2, 3, 4, \ldots$. The sampling frequency per channel should therefore be chosen so that this occurs. According to preceding calculations, $f_{sk}$ shall, for the ideal filter, be equal to $2f_g$, $f_g$, $(2/3)f_g$, $f_g/2$, etc. in order to give the least possible distortion. If these values are used in $2f_g/f_{sk}$, the result will be values that coincide with the values of the attenuation peaks. The previously calculated relationship between $f_{sk}$ and $f_g$ is thus also valid for obtaining a high pulse interference attenuation.

From FIG. 6 it is evident that the attenuation curve 6'' of a cosine filter has attenuation peaks that coincide with the attenuation peaks of the ideal filter. Furthermore, however, cosine filters have attenuation peaks for $2f_g/f_{sk} = 3/2, 5/2, 7/2, \ldots$. This means that attenuation peaks will be obtained if the sampling frequency is chosen equal to $2f_g$, $(4/3)f_g$, $(4/5)f_g$, $(2/3)f_g$, $(4/7)f_g$, $f_g/2$, etc. Even these frequencies coincide with the sampling frequencies that were calculated above for a cosine filter for obtaining minimum distortion.

As regards the gaussian filter, it is evident from FIG. 6, curve 6''', that good attenuation against pulse interference will be obtained if $2f_g/f_{sk}$ is equal to or larger than 1.5. The above calculated condition $f_{sk} \leq 2f_g/1.4$ gives $2f_g/f_{sk} \geq 1.4$. If the sampling frequency in accordance to this condition is chosen equal to or less than $2f_g/1.4$, the result will be good attenuation even against pulse interference.

When, in the preceding, the conditions were derived for the dependence of the pulse repetition frequency on the cutoff frequency of the filter, it was based upon the assumption that very short pulses were involved, so called δ-pulses. This assumption, however, does not necessarily have to be taken at face value in practical application, nor is it necessary to assume that the pulses fed into each transmission channel in the system are of rectangular form.

There is, however, one more condition for obtaining a reproduction of the applied signal free from distortion and that is a pulse ratio in the separate channels which is not too large. It should not exceed a value 0.5, and in practice it cannot do this, as at least two transmission channels are always used. By pulse ratio, reference is made to the relationship between the duration of the pulse and the total length of the cycle.

As is evident from what has been said above, there exists a specific relationship between the pulse repetition frequency per channel and the band width of the transmitted signal, as well as between the above pulse repetition frequency and the band width of the filter equivalent to the transmission channel.

FIGS. 8 and 8a show two different designs of the system in accordance with the invention. According to FIG. 8 the system is connected to an incoming line 1 and an outgoing line 2. Via a low pass filter the incoming signal is transmitted to the different transmission channels 4, 5, 6, and 7. The incoming signal is split with regard to time, the resulting pulses being distributed to the various channels by means of gate circuits 8 connected to each separate channel. These gate circuits 8 are fed pulses from a pulse generator 10 via a shift register 11 and a pulse-shaping network 9 connected to each gate circuit. The pulses that leave the pulse generator are fed to the shift register. From the shift register, pulses are fed in sequential order to the gate circuits in the different channels. Before the pulses reach the gate circuit they are sent through a pulse-shaping network to give them sharper edges and to make it possible to adjust the opening time of the gate circuits independent of the duration of the pulses obtained from the shift register. At the output side of the system, a gate circuit 12 is connected to each transmission channel, which gate circuit works synchronously with its corresponding gate circuit 8 at the input side. By means of the gate circuits 12 the voltage pulses on the various channels are sampled, and the pulses thereby obtained are brought together to the outgoing line. The pulses are then sent through a low pass filter 21 and an amplifier 22. The signal voltage which leaves the amplifier then represents the signal voltage fed into the transmission system. In order to establish synchronism between the gate circuits 8 of the input side and the gate circuits 12 of the output side, a regeneration is made on the output side of the sampling frequency used at the input side. This is done in a well-known manner. The signal is taken out from the outgoing line and sent through a differentiating network 14, a rectifying device 15, a blocking oscillator 16, a resonant circuit 17, tuned to the frequency of the pulse generator 10, and a pulse-shaping network 18. The frequency obtained in this manner is then fed into the shift register 19. From the shift register the pulses are fed in sequential order via pulse-shaping network 13 to the gate circuits 12 of the different channels. To compensate for attenuation and phase shift obtained in the channels, there is a correction device 20 connected in each channel.

FIG. 8a shows a device in which a special transmission channel 23 is used for the control of the gate circuits at the output side of the system. The pulses obtained from the pulse generator 10 on the input side are sent directly via this channel 23 to shift register 19 at the output side. In other respects, this system, like the one previously described, consists on the input side of a low pass filter 3 and of gate circuits 8 which are connected to each channel. These gate circuits are fed from a pulse generator 10 via a shift register 11 and a pulse-shaping network 9. On the output side we have gate circuits 12 connected to each channel, which circuits are controlled from a shift register 19 via a pulse-shaping network 13. Here too a low pass filter 21 and an amplifier 22 are connected to the output side.

FIG. 9 shows a design in which part of the transmission system consists of a carrier frequency unit. The connection of this unit to the transmission system is made between gate circuits 8 of the input side and gate circuits 12 of the output side. The pulses which come in over the channel from the gate circuits to the sending side of the carrier frequency unit are fed via a low pass filter to a modulator to which also is fed a carrier frequency from a generator. The pulses thereby modulate the carrier frequency wave, and the signal obtained is applied to a band pass filter in which a certain frequency band is filtered out. At the receiving side of the carrier frequency unit this frequency band is filtered out by a band pass filter, after which the signal is demodulated in a demodulator fed by the same carrier frequency. The pulses hereby obtained are filtered out by a low pass filter and are then fed into the gate circuit on the output side.

By using a carrier frequency unit of this kind in the transmission system, the original channels that were mainly of a low pass character have been transposed to higher frequency bands. This is evident from FIG. 10, which shows attenuation curves of the different transmission channels and in which $f_1$, $f_2$, $f_3$, and $f_4$ designate the carrier frequency wave in the respective channels.

As a practical example of how to calculate the number of required transmission channels the example described at the beginning of this specification may be taken. There is a program channel with an upper cutoff frequency at 8000 c./s. which shall be transmitted with maintained band width via a number of lines, each of which has a cutoff frequency of 3400 c./s. The attenuation curve of a line can best be represented by that of a poorly matched constant K-filter. However, if attenuation correction is provided, the attenuation curve of the line can be made to coincide in all essentials with the attenuation curve of a gauss filter. Hence, the calculation can be made in the same manner as we would do for such a filter.

$f_{max}$ is thus 8000 c./s.

$f_s$ shall then be at least equal to 16000 c./s.

$f_g$ is 3400 c./s.

According to previously stated conditions, $f_{sk}$ shall be $\leq 2f_g/1.4$.

$f_{sk} \leq 4800$ c./s.

If the number of lines $k$ is chosen to be 4, we get $f_{sk} = f_s/k = 16000/4 = 4000$ c./s. If the number of lines is 4, $f_{sk}$ will thus meet the above stated requirements.

We claim:

A telecommunication system comprising an input and an output for transmitting signals within a predetermined highest frequency value over a number of narrow band channels from a transmitting station to a receiving station, each of said channels including wires inherently equivalent in function to a low pass filter having a cut-off frequency lower than said predetermined frequency value, said equivalent filter corresponding to a filter the attenuation curve of which substantially coincides with the attenuation curve of an ideal filter, said transmitting station comprising a first low pass filter connected to said input for limiting the upper frequency value of the signal to be transmitted to said predetermined value, sampling means connected between said first low pass filter and said channels for time division of said signal into sampling pulses, said sampling means including a first group of gate circuits connected to each of said channels, means controlling said sampling means, said controlling means including a first group of pulse-shaping networks connected to each of said first gate circuits, a first shift register connected to the pulse-shaping networks in said first group, and a pulse generator connected to said first shift register, said generator feeding said register with a predetermined pulse frequency and said first shift register feeding each of the gate circuits in the first group with a pulse frequency equal to said generator pulse frequency divided by the number of said channels; and said receiving station comprising scanning means connected to said channels for scanning said sampling pulses, said scanning means including a second group of gate circuits connected to each of said channels, controlling means controlling said scanning means, said controlling means including a second group of pulse-shaping networks connected to each of the gate circuits in said second group, a second shift register connected to each of said pulse-shaping networks in the second group, means connected to said second shift register for regenerating said pulse frequency of said pulse generator, a second low pass filter connected to said scanning means for limiting the upper frequency of the received signal to said predetermined value, and an amplifier connected between said second filter and said output, whereby in said telecommunication system $$f_s/k = 4f_g/n$$
$$f_s \leq 2f_{max}$$

in which equations $f_s$ is said frequency of said pulse generator $k$ is the number of said narrow band channels $f_g$ is said cut-off frequency of said equivalent low pass filter $f_{max}$ is said highest frequency of said signal to be transmitted $n$ is a factor for determining said pulse frequency fed to said gate circuits, said factor being equal to 2, 4, 6, 8.

References Cited in the file of this patent

UNITED STATES PATENTS

| | | |
|---|---|---|
| 1,778,759 | Gilbert | Oct. 21, 1930 |
| 2,579,071 | Hansell | July 16, 1947 |
| 2,719,189 | Bennett et al. | Sept. 27, 1955 |
| 2,890,285 | Boger et al. | June 9, 1959 |
| 2,909,601 | Fleckenstein et al. | Oct. 20, 1959 |
| 3,087,011 | Boothroyd et al. | Apr. 23, 1963 |